(12) United States Patent
Chen

(10) Patent No.: US 10,608,680 B1
(45) Date of Patent: Mar. 31, 2020

(54) DUAL MODE COMMUNICATION DEVICE AND DUAL MODE COMMUNICATION MODULE

(71) Applicant: Ming-Tsung Chen, Taipei (TW)

(72) Inventor: Ming-Tsung Chen, Taipei (TW)

( * ) Notice: Subject to any disclaimer, the term of this patent is extended or adjusted under 35 U.S.C. 154(b) by 0 days.

(21) Appl. No.: 16/530,555

(22) Filed: Aug. 2, 2019

(51) Int. Cl.
*H04W 88/06* (2009.01)
*H04B 1/00* (2006.01)

(52) U.S. Cl.
CPC ......... *H04B 1/0067* (2013.01); *H04B 1/0064* (2013.01); *H04W 88/06* (2013.01)

(58) Field of Classification Search
CPC .... H04B 1/0067; H04B 1/0064; H04W 88/06
See application file for complete search history.

(56) References Cited

U.S. PATENT DOCUMENTS

2010/0316021 A1* 12/2010 Lerzer ................... H04W 88/06
370/331
2015/0105074 A1* 4/2015 Hu ........................ H04W 48/06
455/435.2
2016/0065247 A1* 3/2016 Kim ......................... H01Q 5/30
455/575.7

* cited by examiner

*Primary Examiner* — Chuong A Ngo
(74) *Attorney, Agent, or Firm* — Li & Cai Intellectual Property (USA) Office

(57) ABSTRACT

A dual mode communication device includes a control module, and a dual mode communication module. The dual mode communication module includes a first interface. The dual mode communication module is electrically connected to the control module through the first interface. The dual mode communication module includes a first communication unit, a second communication unit, a first antenna, and a second antenna. The first communication unit is electrically connected to the first interface. The second communication unit is electrically connected to the first communication unit. The first communication unit controls a turn-on state or a turn-off state of the second communication unit. The first antenna is electrically connected to the first communication unit of the dual mode communication module. The second antenna is electrically connected to the second communication unit of the dual mode communication module.

9 Claims, 4 Drawing Sheets

DUAL MODE COMMUNICATION DEVICE AND DUAL MODE COMMUNICATION MODULE

FIELD OF THE DISCLOSURE

The present disclosure relates to a dual mode communication module and a dual mode communication device, and more particularly to a dual mode communication module and a dual mode communication device that are connected to multiple antennas.

BACKGROUND OF THE DISCLOSURE

Conventional communication modules mostly use a single communication protocol for communication transmission or switch between a plurality of communication protocol communication modules for communication transmission. However, this method of transmission requires not only a large number of communication equipment, but also a detailed design in layout and wiring.

Therefore, providing a dual mode communication device and a dual mode communication module capable of reducing the space occupied by communication equipment has become an important issue in the industry.

SUMMARY OF THE DISCLOSURE

In response to the above-referenced technical inadequacies, the present disclosure provides a dual mode communication device. The dual mode communication device includes a control module, and a dual mode communication module. The dual mode communication module includes a first interface. The dual mode communication module is electrically connected to the control module through the first interface. The dual mode communication module includes a first communication unit, a second communication unit, a first antenna, and a second antenna. The first communication unit is electrically connected to the first interface. The second communication unit is electrically connected to the first communication unit. The first communication unit controls a turn-on state or a turn-off state of the second communication unit. The first antenna is electrically connected to the first communication unit of the dual mode communication module. The second antenna is electrically connected to the second communication unit of the dual mode communication module.

In certain embodiments, the present disclosure provides a dual mode communication module. The dual mode communication module includes a first interface, a first communication unit, a second communication unit, a first antenna, a second antenna, and a switch. The first communication unit is electrically connected to the first interface. The second communication unit is electrically connected to the first communication unit. The first antenna is electrically connected to the first communication unit. The second antenna is electrically connected to the second communication unit. The switch is electrically connected to the first interface, the first communication unit, and the second communication unit. The switch receives a DC voltage. The first communication provides a control signal to the switch for determining a turn-on state or a turn-off state of the second communication unit.

Therefore, the dual mode communication device and the dual mode communication module provided by the present disclosure not only saves space by being configured with two different communication units for receiving and transmitting different communication signals, but also saves costs. In addition, the dual mode communication device and the dual mode communication module of the present disclosure further perform power-saving functions through the first switch, which effectively reduces power consumption.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
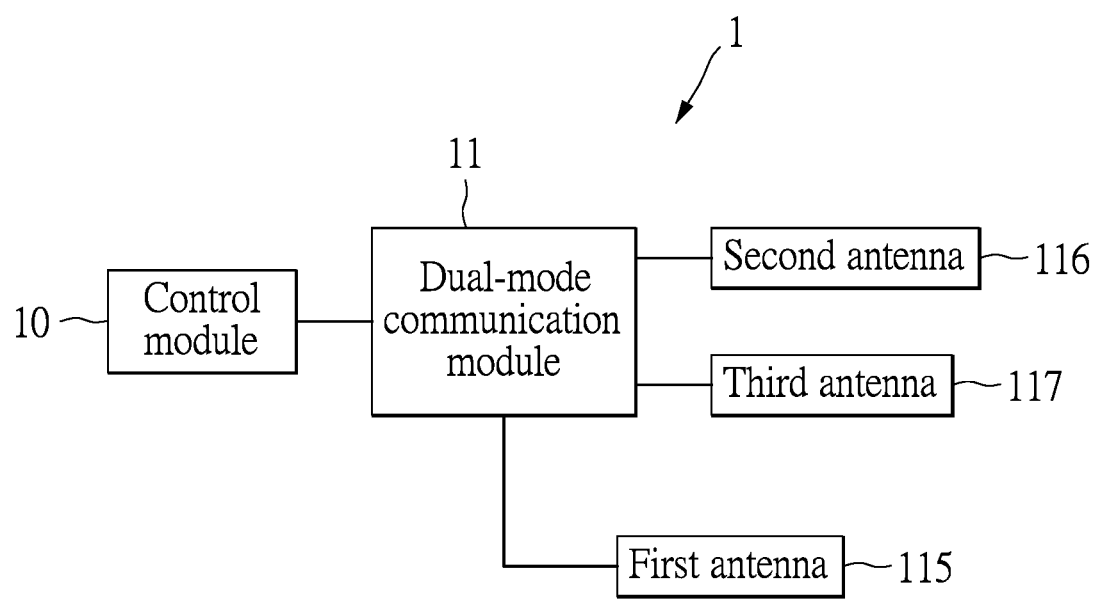
FIG. 1 is a schematic diagram of a dual mode communication device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
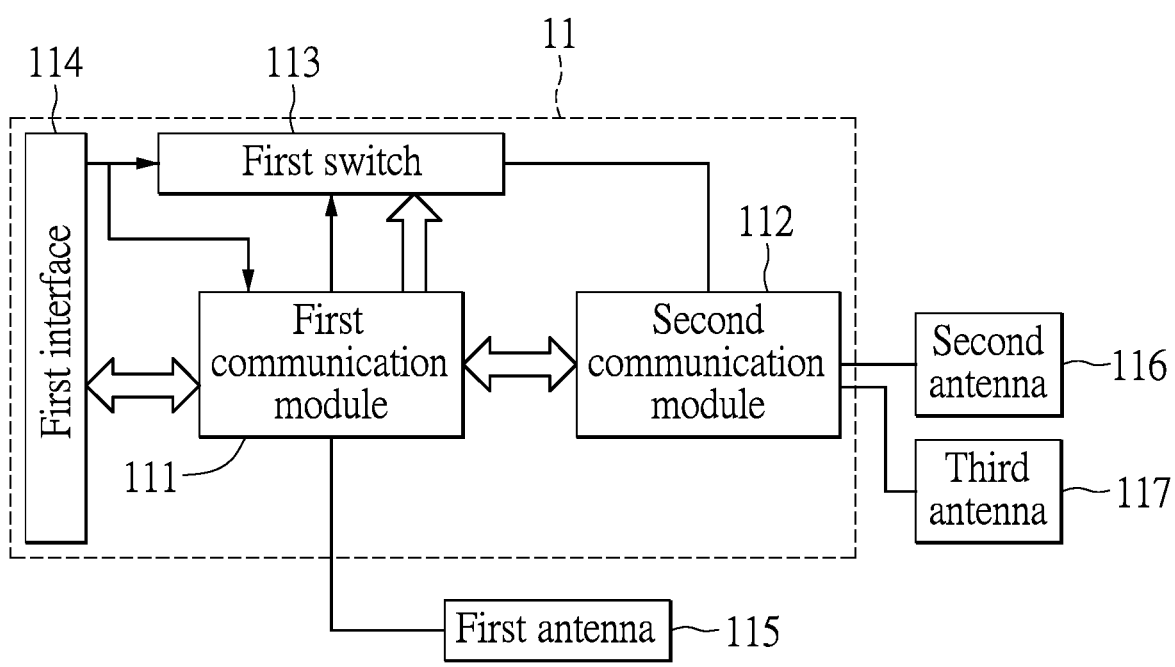
FIG. 2 is a schematic diagram of a dual mode communication module according to the first embodiment of the present disclosure.

Referring to FIG. 1 and FIG. 2, FIG. 1 is a schematic diagram of a dual mode communication device according to a first embodiment of the present disclosure. FIG. 2 is a schematic diagram of a dual mode communication module according to a first embodiment of the present disclosure.

The dual mode communication device 1 includes a control module 10 and a dual mode communication module 11. The control module 10 can be a microprocessor or a central processing unit (CPU), and is not limited in the present disclosure. In the embodiment, the control module 10 is disposed on a circuit board (not shown). The circuit board includes a plurality of slots for electrically connecting at least one dual mode communication module 11. The dual mode communication module 11 is at least connected to a first antenna 115 and a second antenna 116. In the embodiment, the dual mode communication module 11 is also electrically connected to a third antenna 117.

The dual mode communication module 11 includes a first communication unit 111, a second communication unit 112, a first switch 113, a first interface 114, the first antenna 115, the second antenna 116, and the third antenna 117.

The dual mode communication module 11 is electrically connected to the control module 10 through the first interface 114. The first communication unit 111 is electrically connected to the first interface 114. The second communication unit 112 is electrically connected to the first communication unit 111. In the embodiment, the first communication unit 111 is a Bluetooth communication chipset. The second communication unit 112 is a mobile communication technology communication chipset, and the second communication unit 112 is a fourth generation mobile communication technology communication chipset (4G LTE) or a fifth generation mobile communication technology communication chipset (5G). The first antenna 115 is electrically connected to the first communication unit 111 of the dual mode communication module 11. In other words, the first antenna 115 is a Bluetooth communication antenna. The second antenna 116 is electrically connected to the second communication unit 112 of the dual mode communication module 11. The second antenna 116 is a mobile communication technology communication antenna. In other words, the second antenna 116 is a 4G antenna or a 5G antenna, which can be adjusted based on an actual requirements and is not limited in the present disclosure.

Since the dual mode communication device 1 is connected to the first antenna 115 and the second antenna 116, the dual mode communication device 1 can respectively receive or transmit a Bluetooth communication signal (Bluetooth signal) and a mobile communication technology communication signal (4G or 5G signal). Moreover, in this embodiment, the mobile communication technology communication signal (4G or 5G signal) received by the second communication unit 112 is transmitted to the control module 10 after being converted by the first communication unit 111. Therefore, the first communication unit 111 can control the opening and closing of the second communication unit 112 through the first switching unit 113 to save power.

The first switch 113 is electrically connected to the first interface 114, the first communication unit 111 and the second communication unit 112.

The first switch 113 is used for receiving a DC voltage through the first interface 114. In the embodiment, the DC voltage received by the first interface 114 is provided to the first communication unit 111. The second communication unit 112 receives the DC voltage through the first switch 113. In the embodiment, the first communication unit 111 provides a turn-on signal or a turn-off signal to the first switch 113 for controlling a power providing state of the second communication unit 112.

When the second communication unit 112 is required to work, the first communication unit 111 provides a turn-on signal to turn on the first switch 113, and the second communication unit 112 receives the DC voltage. Thus, the second communication unit 112 can transmit the signals. When the second communication unit 112 is not required to work for communication, the first communication unit 111 provides a turn-off signal to turn off the first switch 113, and the power supply of the second communication unit 112 is turned off, accordingly.

In addition, the dual mode communication 11 further includes a third antenna 117. The third antenna 117 is electrically connected to the second communication unit 112. The first interface is a mini-PCIE (mini Peripheral Component Interconnect Express) interface. The third antenna 117 is a GPS communication antenna (Global Positioning System, GPS).

Second Embodiment

Figure 3:
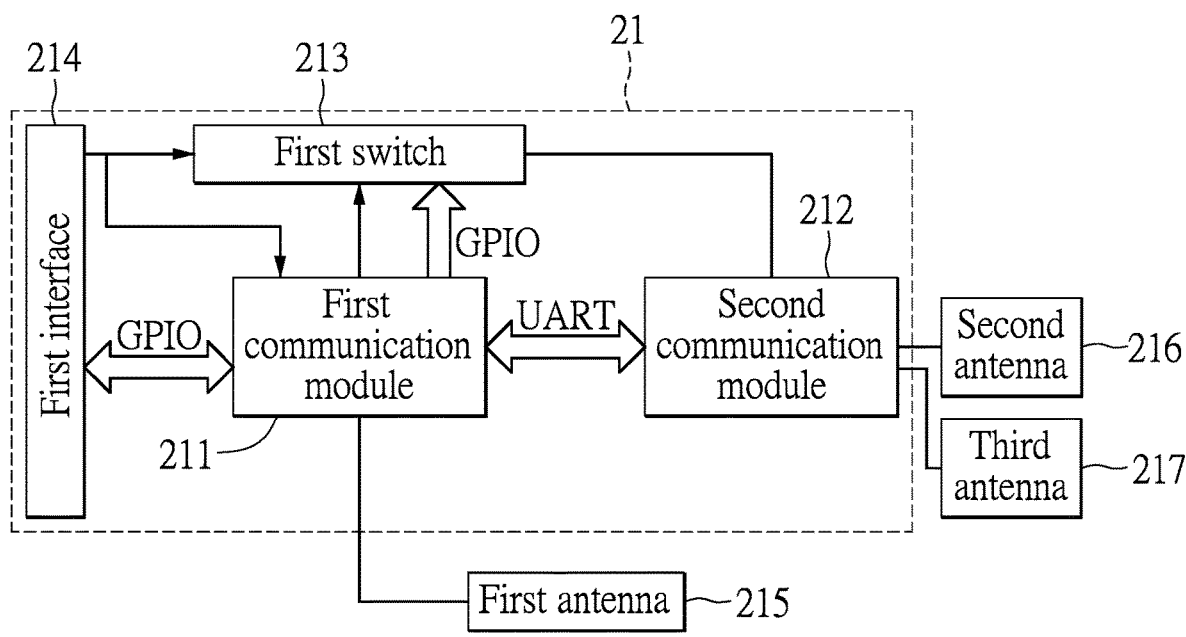
FIG. 3 is a schematic diagram of a dual mode communication module according to a second embodiment of the present disclosure.
Figure 4:
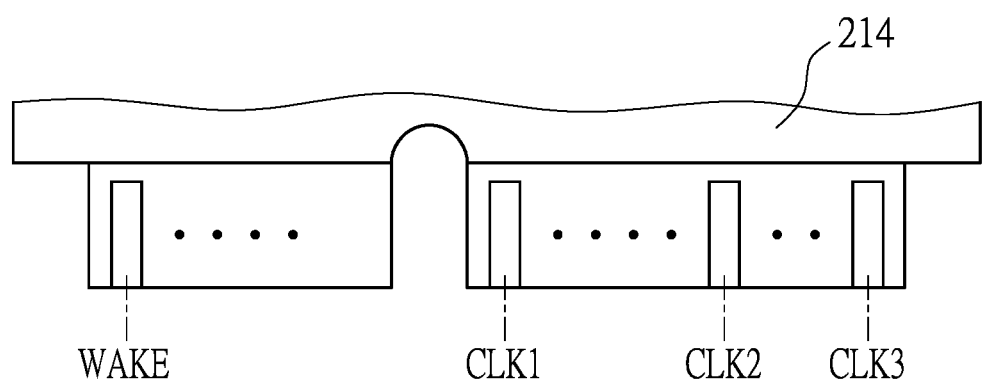
FIG. 4 is a partial diagram of terminals assignments of the first interface of the second embodiment of the present disclosure.

Referring to FIG. 3 and FIG. 4, FIG. 3 is a schematic diagram of a dual mode communication module according to a second embodiment of the present disclosure. FIG. 4 is a partial diagram of terminals assignments of the first interface of the second embodiment of the present disclosure.

The dual mode communication module 21 is at least connected to a first antenna 215 and a second antenna 216. In the embodiment, the dual mode communication module 21 is also electrically connected to a third antenna 217.

The dual mode communication module 21 includes a first communication unit 211, a second communication unit 212, a first switch 213, a first interface 214, the first antenna 215, the second antenna 216, and the third antenna 217.

The dual mode communication module 21 is electrically connected to the control module 10 through the first interface 214. The first communication unit 211 is electrically connected to the first interface 214. The second communication unit 212 is electrically connected to the first communication unit 211. In the embodiment, the first communication unit 211 is a Bluetooth communication chipset. The second communication unit 212 is a mobile communication technology communication chipset, and the second communication unit 212 is a fourth generation mobile communication technology communication chipset (4G LTE) or a fifth generation mobile communication technology communication chipset (5G). The first antenna 215 is electrically connected to the first communication unit 211 of the dual mode communication module 11. In other words, the first antenna 215 is a Bluetooth communication antenna. The second antenna 216 is electrically connected to the second communication unit 212 of the dual mode communication module 21. The second antenna 216 is a mobile communication technology communication antenna. In other words, the second antenna 216 is a 4G antenna or a 5G antenna, which can be adjusted based on an actual requirements and is not limited in the present disclosure.

The first communication unit 211 is electrically connected to the second communication unit 212 by a universal asynchronous receiver/transmitter interface (UART). The first communication unit 211 is electrically connected to the first interface 214 and the first switch 213 by a general-purpose input/output interface (GPIO).

Since the dual mode communication module 2 is connected to the first antenna 215 and the second antenna 216, the dual mode communication module 21 can respectively receive or transmit a Bluetooth communication signal (Bluetooth signal) and a mobile communication technology communication signal (4G or 5G signal). Moreover, in this embodiment, the mobile communication technology communication signal (4G or 5G signal) received by the second communication unit 212 is transmitted to an outside controller (not shown) after being converted by the first communication unit 211. Therefore, the first communication unit 211 can control the opening and closing of the second communication unit 212 through the first switch 213 to save power.

The first switch 213 is electrically connected to the first interface 214, the first communication unit 211 and the second communication unit 212.

The first switch 213 is used for receiving a DC voltage through the first interface 214. In the embodiment, the DC voltage received by the first interface 214 is provided to the first communication unit 211. The second communication unit 212 receives the DC voltage through the first switch 213. In the embodiment, the first communication unit 211 provides a turn-on signal or a turn-off signal to the first switch 213 for controlling a power providing state of the second communication unit 212.

When the second communication unit 212 is required to work, the first communication unit 211 provides a turn-on signal to turn on the first switch 213, and the second communication unit 112 receives the DC voltage. Therefore, the second communication unit 212 can transmit the signals. When the second communication unit 212 is not required to work for communication, the first communication unit 111 provides a turn-off signal to turn off the first switch 213, and the power supply of the second communication unit 112 is turned off, accordingly.

In addition, the dual mode communication 21 further includes a third antenna 117. The third antenna 217 is electrically connected to the second communication unit 212. The first interface is a mini-PCIE (mini Peripheral Component Interconnect Express) interface. The third antenna 217 is a GPS communication antenna (Global Positioning System, GPS).

Referring to FIG. 4, since the dual mode communication module 21 needs to be connected or electrically connected to the external controller, at least four terminals are assigned in the first interface 214, which are the wake-up signal terminal WAKE, the first clock signal terminal CLK1, the second clock signal terminal CLK2, and the third clock signal terminal CLK3. In other words, the first interface 214 of the dual mode communication module 21 includes at least three clock signals. In practical implementation, the first interface 214 also includes other external signal terminals, which are omitted in the present disclosure for the sake of brevity.

In conclusion, the dual mode communication device and the dual mode communication module provided by the present disclosure not only saves space by being configured with two different communication units for receiving and transmitting different communication signals, but also saves costs. In addition, the dual mode communication device and the dual mode communication module of the present disclosure further perform power-saving functions through the first switch, which effectively reduces power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual mode communication device comprising:
a control module; and
a dual mode communication module including a first interface, the dual mode communication module being electrically connected to the control module through the first interface, and the dual mode communication module including:
a first communication unit electrically connected to the first interface;
a second communication unit electrically connected to the first communication unit, wherein the first communication unit controls a turn-on state or a turn-off state of the second communication unit;
a first antenna electrically connected to the first communication unit of the dual mode communication module;
a second antenna electrically connected to the second communication unit of the dual mode communication module; and
a first switch, and the first switch is electrically connected to the first interface, the first communication unit and the second communication unit, the first communication unit controlling the first switch to turn on or turn off the second communication unit, a plurality of communication signals having a first communication protocol transmitted to the second communication unit by the first communication unit and converted into a plurality of communication signals having a second communication protocol by the second communication unit, a plurality of communication signals having the second communication protocol transmitted to the first communication unit by the second communication unit and converted into a plurality of communication signals having the first communication protocol by the first communication unit, the first communication protocol and the second communication protocol being different.

2. The dual mode communication device of claim 1, wherein the first interface is a mini Peripheral Component Interconnect Express interface.

3. The dual mode communication device of claim 1, wherein the dual mode communication module further includes a third antenna, and the third antenna is electrically connected to the second communication unit.

4. The dual mode communication device of claim 3, wherein the first antenna is a Bluetooth antenna, the second antenna is a mobile communication technology antenna, and the third antenna is a Global Positioning System antenna.

5. A dual mode communication module comprising:
a first interface;
a first communication unit electrically connected to the first interface;
a second communication unit electrically connected to the first communication unit;
a first antenna electrically connected to the first communication unit;

a second antenna electrically connected to the second communication unit; and a switch electrically connected to the first interface, the first communication unit, and the second communication unit, the switch receiving a DC voltage;

wherein the first communication provides a control signal to the switch for determining a turn-on state or a turn-off state of the second communication unit;

wherein the first communication unit controls the switch to turn on or turn off the second communication unit, a plurality of communication signals having a first communication protocol are transmitted to the second communication unit by the first communication unit and converted into a plurality of communication signals having a second communication protocol by the second communication unit, a plurality of communication signals having the second communication protocol are transmitted to the first communication unit by the second communication unit and converted into a plurality of communication signals having the first communication protocol by the first communication unit, the first communication protocol and the second communication protocol are different.

6. The dual mode communication module of claim 5, wherein the first interface is a mini Peripheral Component Interconnect Express interface.

7. The dual mode communication module of claim 5, wherein the dual mode communication module further includes a third antenna, and the third antenna is electrically connected to the second communication unit.

8. The dual mode communication module of claim 7, wherein the first antenna is a Bluetooth antenna, the second antenna is a mobile communication technology antenna, and the third antenna is a Global Positioning System antenna.

9. The dual mode communication module of claim 5, wherein the first interface includes a wake-up signal terminal, a first clock signal terminal, a second clock signal terminal, and a third clock signal terminal.

* * * * *